United States Patent
Albin

(10) Patent No.: US 9,328,750 B2
(45) Date of Patent: May 3, 2016

(54) STRAP CLAMP

(71) Applicant: Stephen D. Albin, Los Altos, CA (US)

(72) Inventor: Stephen D. Albin, Los Altos, CA (US)

(73) Assignee: Stephen D. Albin, Los Altos, CA (US)

( * ) Notice: Subject to any disclaimer, the term of this patent is extended or adjusted under 35 U.S.C. 154(b) by 0 days.

(21) Appl. No.: 14/687,034

(22) Filed: Apr. 15, 2015

(65) Prior Publication Data

US 2015/0292535 A1 Oct. 15, 2015

Related U.S. Application Data

(60) Provisional application No. 61/979,956, filed on Apr. 15, 2014.

(51) Int. Cl.
| | |
|---|---|
| *F16B 2/08* | (2006.01) |
| *A44B 11/16* | (2006.01) |
| *A44B 11/00* | (2006.01) |
| *F16B 2/12* | (2006.01) |
| *F16B 2/06* | (2006.01) |

(52) U.S. Cl.
CPC ............. *F16B 2/08* (2013.01); *A44B 11/005* (2013.01); *A44B 11/16* (2013.01); *F16B 2/12* (2013.01); *F16B 2/06* (2013.01)

(58) Field of Classification Search
CPC ............ B25B 5/068; B25B 5/163; B25B 5/06
See application file for complete search history.

(56) References Cited

U.S. PATENT DOCUMENTS

| | | | |
|---|---|---|---|
| 4,926,722 A | 5/1990 | Sorensen et al. | |
| 7,665,718 B1 * | 2/2010 | Benson | B25B 27/10 269/237 |
| 8,297,605 B2 * | 10/2012 | Lee | F16C 11/106 269/130 |
| 8,382,047 B1 * | 2/2013 | Hildebrand | F16L 3/003 248/316.4 |
| 2011/0221110 A1 * | 9/2011 | Ranieri | B25B 5/04 269/6 |
| 2014/0284861 A1 * | 9/2014 | Chen | B25B 5/068 269/216 |

* cited by examiner

*Primary Examiner* — Lee D Wilson
(74) *Attorney, Agent, or Firm* — Beyer Law Group LLP

(57) ABSTRACT

A strap clamp arranged to securely cinch a strap around a target object is described. The strap clamp includes a bar and a clutch assembly slideably mounted on the bar. A strap is carried by the clutch assembly and a strap fastener is attached to the bar. The strap fastener is arranged to releasably engage the strap. When the strap fastener is engaged, the strap is held fixed relative to the bar thereby forming a loop between the fastener and the clutch assembly. When the strap fastener is released, the strap may be pulled through the fastener to adjust the length of the loop. The clutch assembly may include a clutch mechanism, an actuator and a clutch release. The clutch mechanism prevents the clutch assembly from moving away from the strap fastener when engaged. The actuator is arranged to move the clutch assembly towards the strap fastener when actuated.

12 Claims, 6 Drawing Sheets

STRAP CLAMP

CROSS REFERENCE TO RELATED APPLICATIONS

This application claims priority of Provisional Application No. 61/979,956, filed Apr. 15, 2014, which is incorporated herein by reference.

FIELD OF THE INVENTION

The present disclosure relates to clamps. In particular, the present disclosure relates to strap clamps that are easily adjustable.

BACKGROUND

There are a wide variety of clamps currently available that are suitable for use in a wide variety of applications. Although existing clams work well, there are a number of applications where new clamp designs would be useful. The present application proposes a strap clamp that can be used to clamp a wide variety of different items.

SUMMARY

A novel strap clamp is described. The strap clamp is arranged to securely cinch a strap around a target object in a convenient manner. In some, embodiments, the strap clamp includes a bar and a clutch assembly slideably mounted on the bar such that the clutch assembly is moveable along the bar. A strap is carried by the clutch assembly and a strap fastener is attached to the bar. The strap fastener is arranged to releasably engage the strap. When the strap fastener is engaged, a portion of the strap is held fixed relative to the bar to thereby form a loop of strap between the strap fastener and the clutch assembly. When the strap fastener is released, the strap may be pulled through the strap fastener to adjust the length of the loop. The clutch assembly may include a clutch mechanism, an actuator and a clutch release. The clutch mechanism is arranged to prevent the clutch assembly from moving away from the strap fastener when engaged. The actuator is arranged to move the clutch assembly towards the strap fastener along the bar when actuated. Actuation of the clutch release permits the clutch assembly to be more freely moved away from the strap fastener.

These and other features of the present invention will be described in more details below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present disclosure will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The strap clamp discussed herein allows a user to grip objects that have varying geometries and dimensions. In particular, a strap clamp may be used to grip various shaped objects including circular, triangular, polygonal, odd-shaped and/or other shaped objects. As such, a user is able to orient a strap around an object and pull the strap tight enough to sufficiently grip the object. The user may then cinch the strap using a trigger operated mechanism that is part of the strap clamp.

Figure 1:
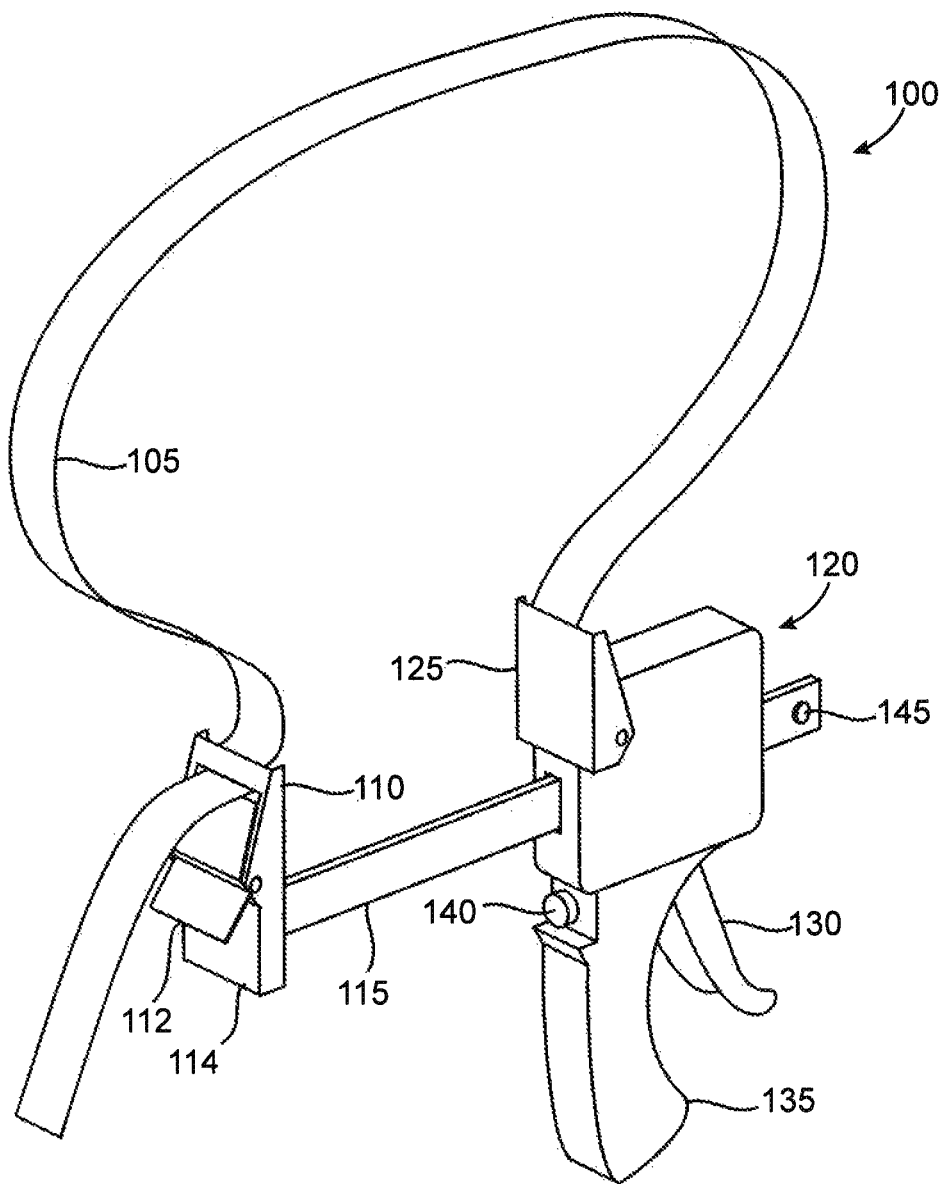
FIG. 1 illustrates a perspective view of a strap clamp, in accordance with an embodiment of the present invention.

FIG. 1 illustrates a perspective view of a strap clamp 100, in accordance with embodiments of the present invention. In particular, FIG. 1 includes: strap 105 having an end bracket 125; a strap fastener 110 having a strap release 112 and a strap fastener base 114; bar 115; a housing or body 120 that houses a clutch mechanism (not shown in FIG. 1); a clutch trigger 130; hand grip 135; and clutch release 140.

The strap 105 may be formed from any suitable flexible material. By way of example, nylon straps work well although a variety of other strap materials may be used. In the illustrated embodiment, the proximal end of strap 105 has an end bracket 125 that is secured to body 120. Preferably, the end bracket is releasably attached to the body 120 (or other suitable structure) so that the strap 105 can readily be replaced (e.g., with straps of different length, size or material, or when worn, etc.). The end bracket 125 may be secured to the body 120 using a pin arrangement, a bolt/nut combination or any other suitable fastener mechanism. In other embodiments, the end bracket or the strap webbing itself can be fixedly coupled to the body.

The clamp body 120 has a passage there through that receives an elongated bar 115. The bar 115 may have any suitable cross-sectional geometry. In the illustrated embodiment a flat bar is used—although cylindrical rods and other bar geometries may be used in other embodiments. A strap fastener 110 is carried at the distal end of the bar 115. In the illustrated embodiment, the strap fastener takes the form of a buckle, having a spring loaded release 112 pivotally mounted to strap fastener base 114. The strap 105 passes through the strap fastener 110 and its working length (i.e., the strap length between the strap fastener 110 and end bracket 125) can readily be adjusted. In particular, when strap release 112 is open, strap 105 may move freely through strap fastener 110 and when strap release 112 is closed, then strap 105 is held securely in place by the spring loaded release. The strap fastener base 114 may be secured to bar 115 using any suitable attachment mechanism. By way of example, welding or press-fitting both work well.

Clamp body 120 houses a clutch assembly 152 that releasably holds the body 120 in place relative to bar 115. As will be described in more detail below with respect to FIG. 6, pulling trigger 130 draws the bar 115 inward a small distance effectively pulling the strap fastener 110 towards the body 120 (alternatively, this relative motion can be considered pulling the body towards the strap fastener). Releasing the trigger causes the clutch assembly to hold the bar in place relative to the clutch body. Therefore, the body 120 can be moved sequentially across bar 115 towards strap fastener 110 by repeatedly pulling trigger 130. The clutch can effectively be disengaged from the bar 115 by pressing clutch release button 140. When the clutch is disengaged, the bar 115 can relatively freely slide through the body inward or outward to adjust the relative distance between the strap fastener 110 and the end bracket 125.

Figure 2:
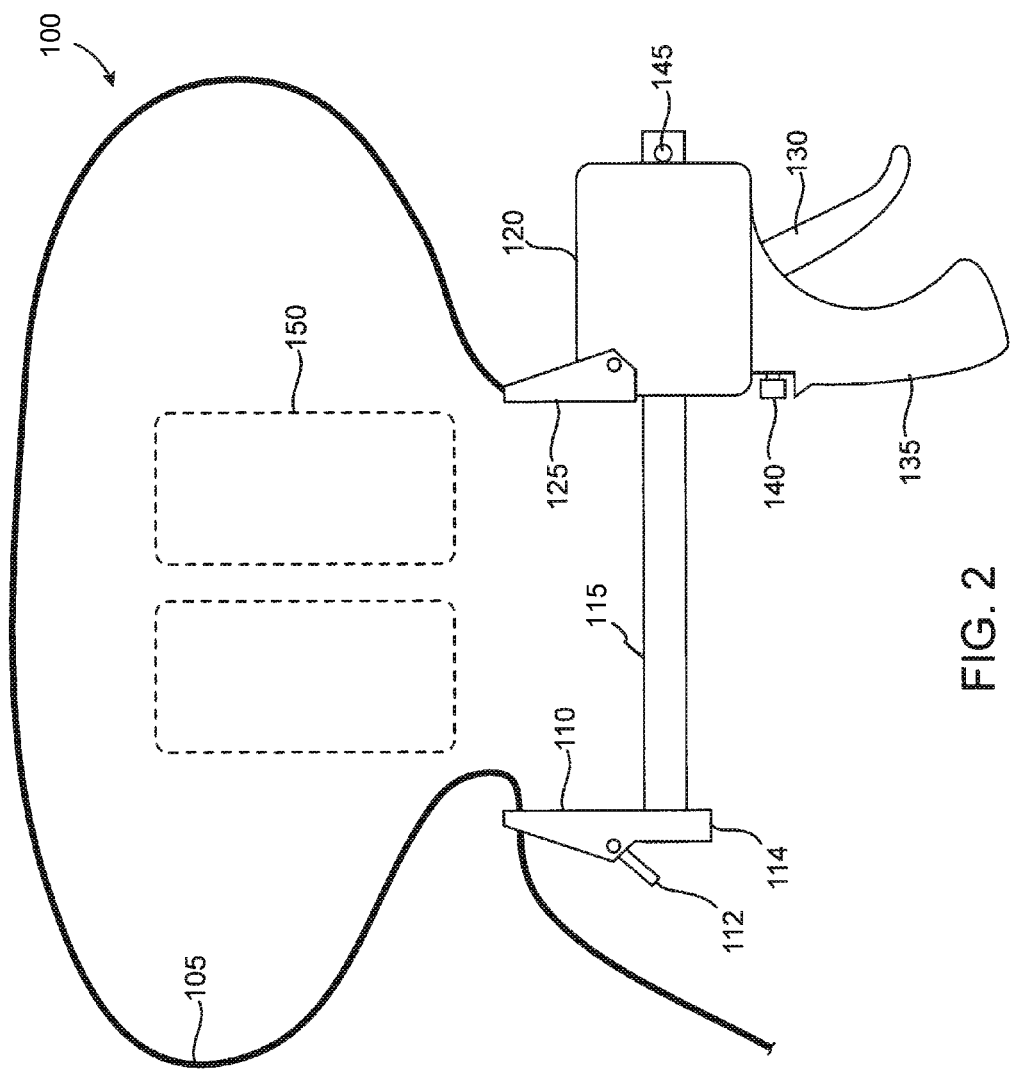
FIG. 2 illustrates a front view of the strap clamp of FIG. 1 with the strap and clamp body in a first position.
Figure 3:
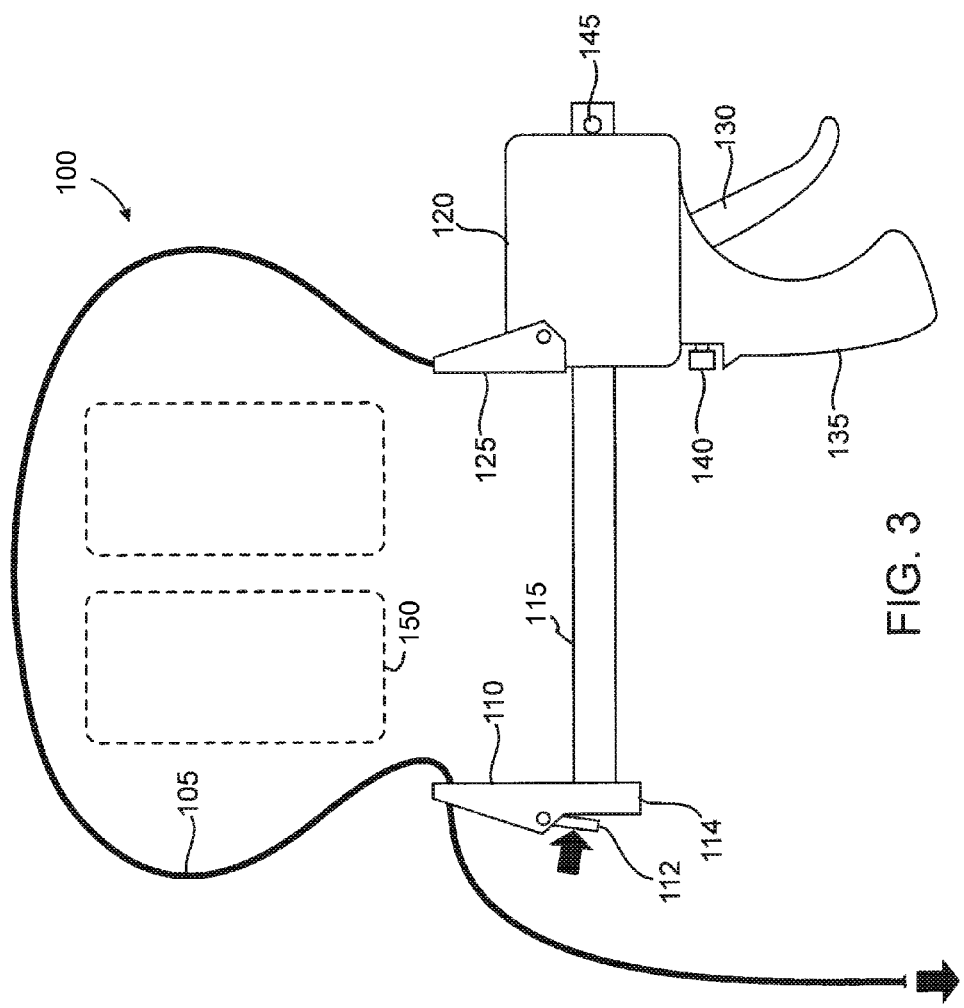
FIG. 3 illustrates a front view of the strap clamp of FIG. 1 with the strap in a second position.

A representative use of the strap clamp 100 will be described with reference to the sequence of FIGS. 2-5. As best seen in FIG. 2 the strap 105 of strap clamp 100 may be positioned around a target object (blocks 150 in the illustration). The strap may then be coarsely tightened around the blocks 150 by pushing strap release 112 and pulling the strap through the strap fastener 110 towards the position shown in FIG. 3 (and tighter as appropriate). It can be seen that the working section of strap 105 is shorter in the position shown in FIG. 3 than in the position shown in FIG. 2. Once the desired strap working length has been achieved (as for example in the position of FIG. 4), the strap release 112 is released, thereby locking the strap in place.

Figure 4:
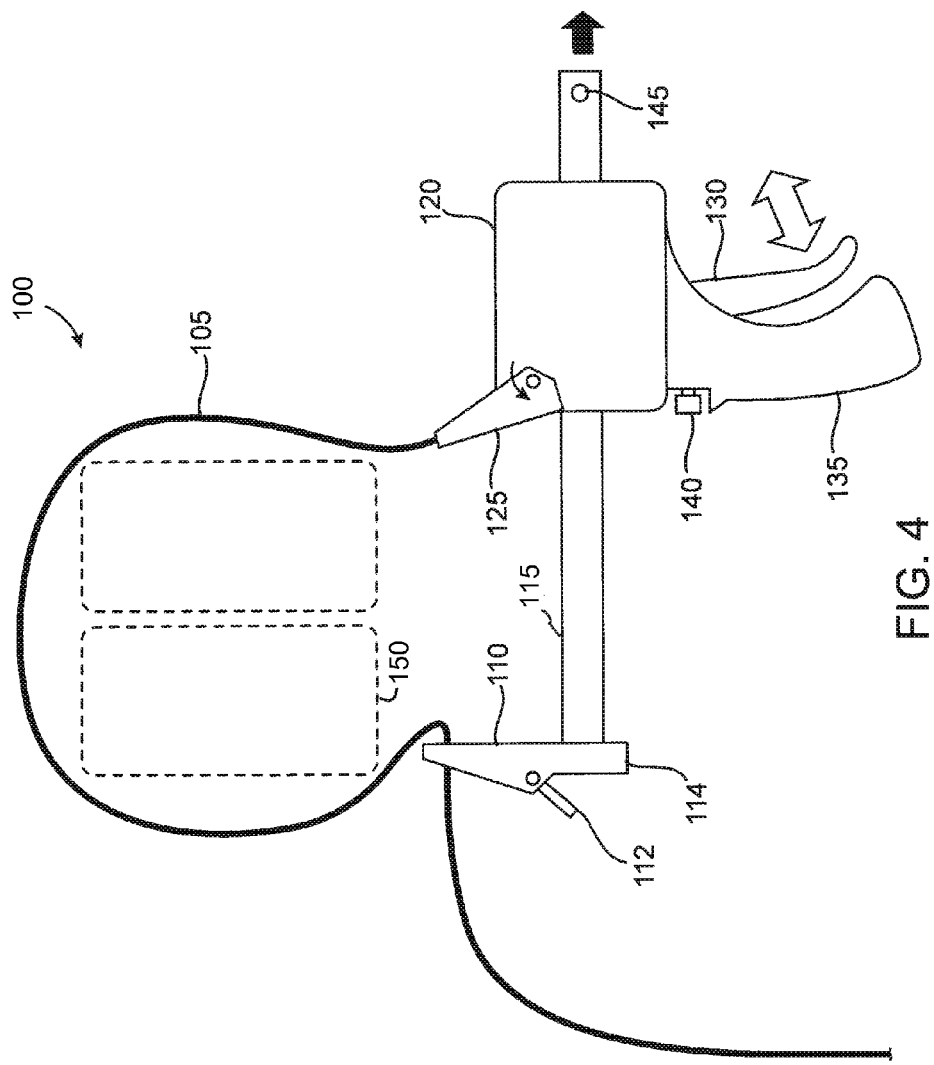
FIG. 4 illustrates a front view of the strap clamp of FIG. 1 with the strap and clamp body in a third position.
Figure 5:
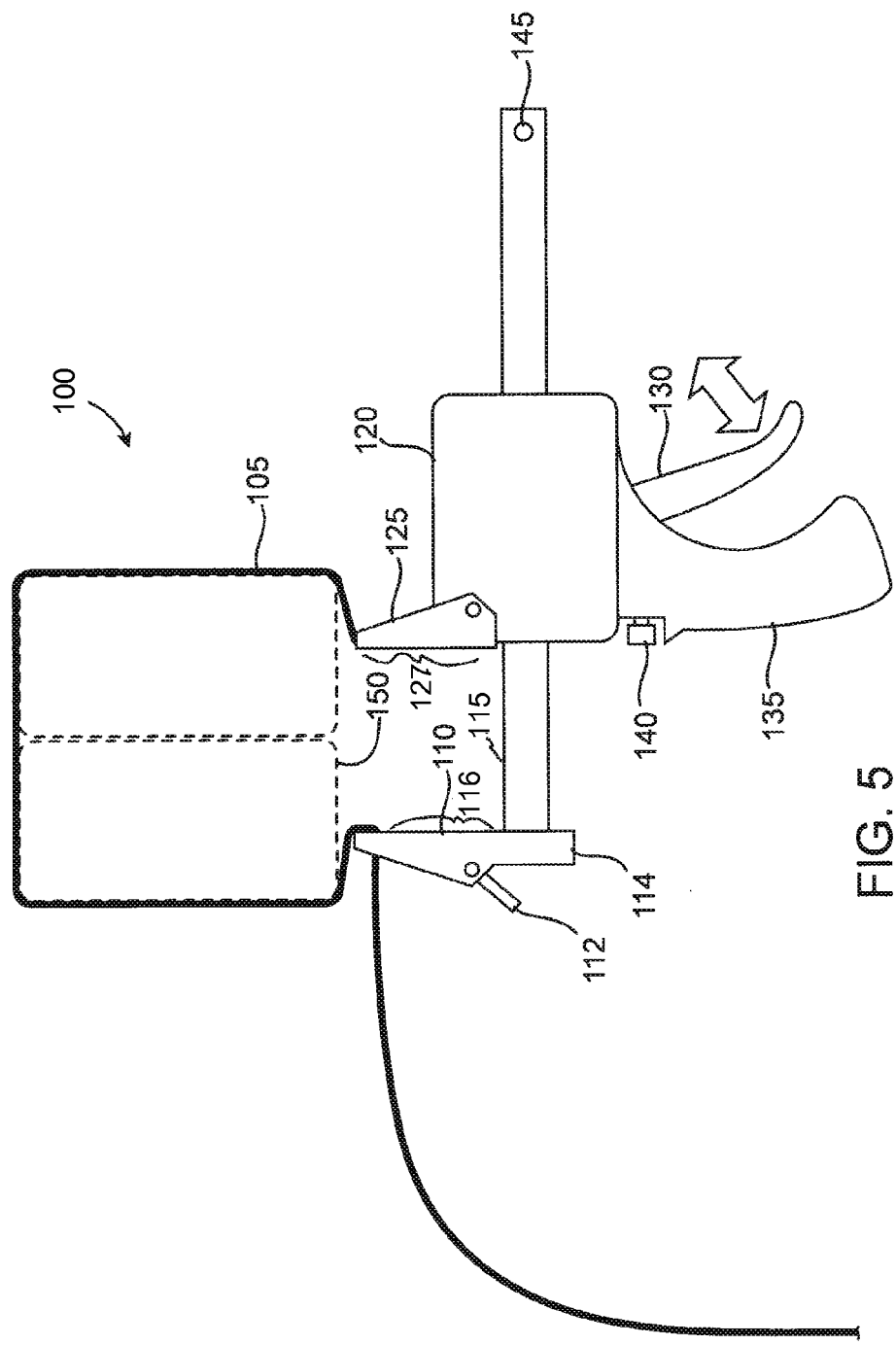
FIG. 5 illustrates a front view of the strap clamp of FIG. 1 with the strap and clamp body in a fourth position.

Thereafter, the trigger 130 may be pulled to move the body 120 towards the strap fastener 110, which has the effect of cinching the working section of strap 105 about the target object 150, as can be seen by reference to FIGS. 4 and 5, with FIG. 5 showing the cinched position. The actual number of times the trigger needs to be actuated to cinch the strap will depend in large part on the initial tightness of the strap when cinching begins.

Figure 6:
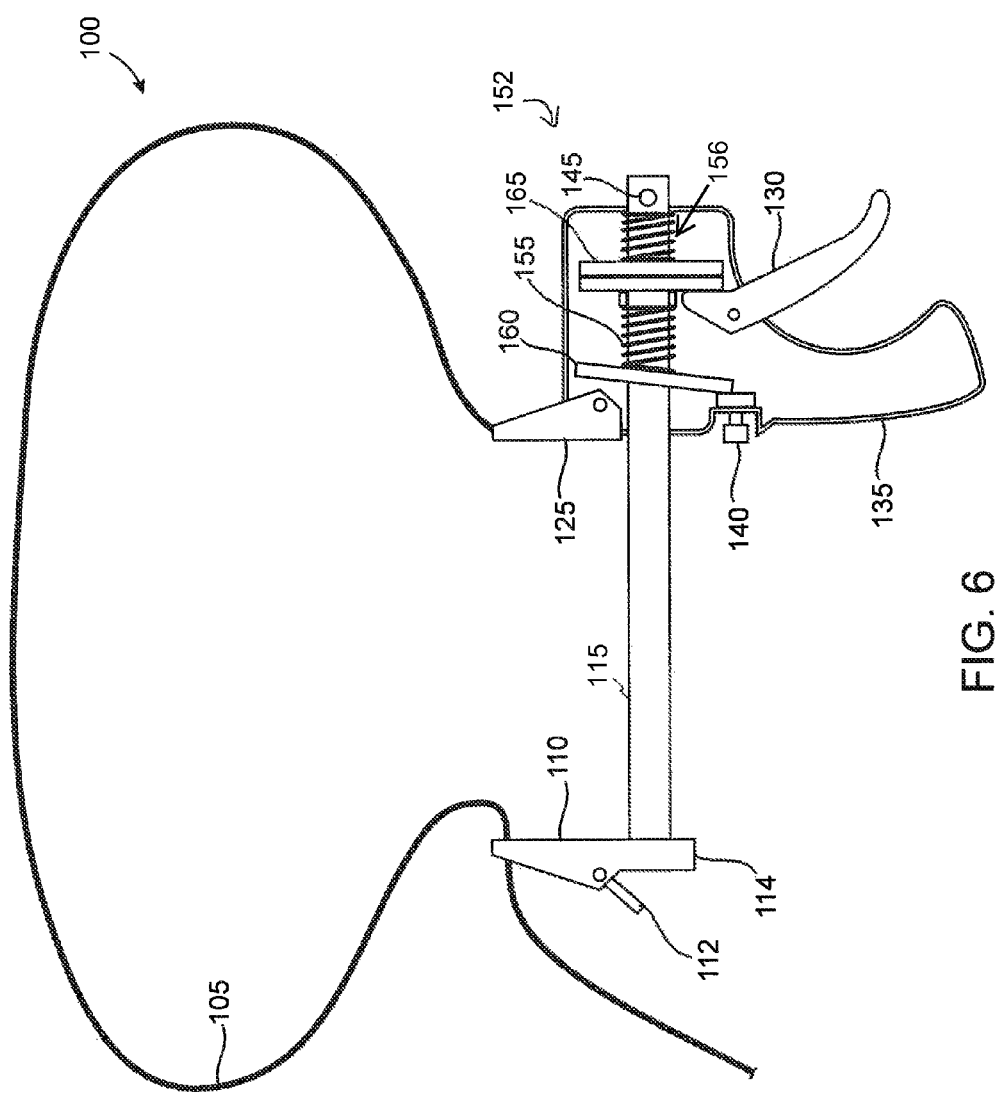
FIG. 6 illustrates a sectional view of a strap clamp illustrating selected clutch components.

A variety of different mechanical arrangements can be used to implement the clutch mechanism. By way of example, one suitable clutch mechanism is illustrated in FIG. 6 and described below. Another suitable bar clamping mechanical assembly is described in U.S. Pat. No. 4,926,722 which is incorporated herein by reference.

FIG. 6 illustrates a cut-away view of a strap clamp 100 showing internal components of a clutch assembly 152 that is suitable for implementing the desired clamping functionality. In addition to housing 120, trigger 130 and clutch release button 140, the clutch assembly 152 includes, coil springs 155 and 156, binding plate (lever) 160, and ratcheting plates (levers) 165.

Plate 160 is biased by spring 155 to bind against the slide bar 115 to thereby prevent motion of the slide bar relative to clutch assembly 152. The binding can be released by pressing clutch release 140—which pivots plate 160 (against the force of spring 155) enough to release the bind thereby allowing the bar 155 to be moved in or out relative to the housing 120. Trigger 130 is pivotally coupled to the housing 120 and includes a cam surface that engages one of the ratcheting plates 165. Pulling trigger 130 effectively pushes bar 115 to the right in the orientation of FIG. 6 thereby drawing the strap fastener 110 and the housing 120 closer together. When the trigger is released, plate 60 binds the bar 115 thereby holding the clutch assembly 152 in the advanced position. Thus, by repeatedly pulling trigger 130, the housing 120/clutch assembly 152 and the strap fastener 110 can be drawn closer together in a ratcheting manner. When the strap is wrapped around a target object 150, the clamp assembly can be advanced until the strap is pulled tight around the target object, thereby cinching the strap about the target object in a secure manner. Even under a heavy load/tight cinch, the strap clamp can easily be released by simply pushing the clutch release button 140. When released, the bar 115 can move freely relative to the clamp assembly 152. Of course, the target object could also be released by pushing strap fastener release 112 and loosening the strap 105, although that would not be expected to be the normal use case.

While this invention has been described in terms of several preferred embodiments, there are alterations, permutations, and substitute equivalents, which fall within the scope of this invention. It should also be noted that there are many alternative ways of implementing the methods and apparatuses of the present invention. For example the specific structures of the various components including the strap fastener 110, the clamping assembly 152, the clamp release 140, trigger 130 and body 120 and grip 135 may all be varied without departing from the spirit of the invention. For example, although a push button release 130 is shown, it should be appreciated that a variety of pivoted triggers or other structures may be used in its place. It is therefore intended that the following appended claims be interpreted as including all such alterations, permutations, and substitute equivalents as fall within the true spirit and scope of the present invention.

The invention claimed is:

1. A strap clamp, comprising:
   a bar;
   a clutch assembly slideably mounted on the bar such that the clutch assembly is moveable along the bar, the clutch assembly including a clutch housing, a clutch mechanism, an elongated trigger and a clutch release;
   a strap having a first end portion secured to the clutch housing;
   a strap fastener attached to a first end of the bar, the strap fastener being arranged to releasably engage the strap, wherein when the strap fastener is engaged, a portion of the strap is held fixed relative to the bar to thereby form a loop of strap between the clutch assembly and the strap fastener and when the strap fastener is released, the strap may be pulled through the strap fastener to adjust the length of the loop; and
   a hand grip fixed to the clutch housing, the trigger being pivotally mounted to one of the clutch housing and the hand grip, wherein actuation of the trigger causes the clutch mechanism and therefore the clutch assembly to ratchet towards the strap fastener along the bar and wherein the hand grip and trigger are sized and configured such that the strap clamp can be held by an operator in a single hand with the palm of the hand on the grip and one or more fingers on the trigger whereby the operator can ratchet the cam assembly towards the strap fastener a by pulling the trigger towards the grip one or more times while holding the strap clamp with the single hand; and
   wherein (i) the clutch mechanism is arranged to prevent the clutch assembly from moving away from the strap fastener when the clutch mechanism is engaged, (ii) the clutch release includes a push button arranged to disengage the clutch when depressed, and (iii) actuation of the clutch release permits the clutch assembly to be moved away from the strap fastener.

2. A strap clamp, comprising:
   a bar;
   a clutch assembly slideably mounted on the bar such that the clutch assembly is moveable along the bar;
   a strap carried by the clutch assembly;
   a strap fastener attached to the bar, the strap fastener being arranged to releasably engage the strap, wherein when the strap fastener is engaged, a portion of the strap is held fixed relative to the bar to thereby form a loop of strap between the clutch assembly and the strap fastener and when the strap fastener is released, the strap may be pulled through the strap fastener to adjust the length of the loop;

wherein the clutch assembly includes a clutch mechanism, an actuator and a clutch release, wherein (i) the clutch mechanism is arranged to prevent the clutch assembly from moving away from the strap fastener when engaged, (ii) actuation of the actuator causes the clutch assembly to move towards the strap fastener along the bar; and (iii) actuation of the clutch release permits the clutch assembly to be moved away from the strap fastener.

3. A strap clamp as recited in claim 2 wherein the strap fastener is attached to a distal end of the rod.

4. A strap clamp as recited in claim 2 wherein the clutch mechanism includes a plurality of springs, a clutch plate and at least one ratcheting plate.

5. A strap clamp as recited in claim 2 wherein the strap fastener is a spring loaded buckle.

6. A strap clamp as recited in claim 2 wherein the clutch assembly further includes a clutch housing, and the strap is directly attached to the clutch housing.

7. A strap clamp as recited in claim 6 wherein the strap includes a strap buckle that is pivotally mounted to the clutch housing.

8. A strap clamp as recited in claim 2 wherein the bar is selected from the group consisting of a flat bar and a cylindrical rod.

9. A strap clamp as recited in claim 6 wherein:
the clutch housing includes a hand grip and the actuator includes an elongated trigger that is pivotally mounted to the clutch housing; and
pulling the trigger towards the hand grip causes the clutch assembly to ratcheted towards the strap fastener.

10. A strap clamp as recited in claim 9 wherein the grip and trigger are sized and configured such that the strap clamp can be held by an operator in a single hand with the palm of the hand on the grip and one or more fingers on the trigger whereby the operator can ratchet the cam assembly towards the strap fastener a by pulling the trigger towards the grip one or more times while holding the strap clamp with the single hand.

11. A strap claim as recited in claim 10 wherein the clutch release includes a push button arranged to disengage the clutch when pushed and is positioned on the housing at a location where it can be pushed by the operator's thumb of the hand that is holding the strap clamp with the fingers on the trigger.

12. A strap claim as recited in claim 1 wherein the clutch release includes a push button arranged to disengage the clutch mechanism when pushed.

* * * * *

UNITED STATES PATENT AND TRADEMARK OFFICE
CERTIFICATE OF CORRECTION

PATENT NO.        : 9,328,750 B2
APPLICATION NO.   : 14/687034
DATED             : May 3, 2016
INVENTOR(S)       : Stephen D. Albin It is certified that error appears in the above-identified patent and that said Letters Patent is hereby corrected as shown below:

In the Claims

1. Claim 11 (column 6, line 18) change "claim" to --clamp--.

2. Claim 12 (column 6, line 24) change "claim" to --clamp--.

Signed and Sealed this
Second Day of August, 2016

Michelle K. Lee
*Director of the United States Patent and Trademark Office*